(12) United States Patent
Haala (10) Patent No.: US 7,334,259 B2
(45) Date of Patent: Feb. 19, 2008

(54) NATIONAL IDENTIFICATION CARD SYSTEM AND BIOMETRIC IDENTITY VERIFICATION METHOD FOR NEGOTIATING TRANSACTIONS

(75) Inventor: Catherine A. Haala, Stamford, CT (US)

(73) Assignee: Crosscheck Identification Systems International, Inc., Stamford, CT (US)

( * ) Notice: Subject to any disclaimer, the term of this patent is extended or adjusted under 35 U.S.C. 154(b) by 298 days.

(21) Appl. No.: 11/283,911

(22) Filed: Nov. 22, 2005

(65) Prior Publication Data

US 2006/0224899 A1    Oct. 5, 2006

Related U.S. Application Data

(63) Continuation of application No. 10/994,365, filed on Nov. 23, 2004, now Pat. No. 6,971,031, which is a continuation of application No. 09/985,734, filed on Nov. 6, 2001, now Pat. No. 6,934,861.

(51) Int. Cl.
    *H04K 1/00*    (2006.01)
(52) U.S. Cl. .................. 726/7; 726/1; 726/9; 713/186; 713/172; 713/176; 713/180; 709/200; 705/44; 705/67; 382/115; 382/116
(58) Field of Classification Search .................. None
    See application file for complete search history.

(56) References Cited

U.S. PATENT DOCUMENTS 3,702,392 A    11/1972    St. Jean

| 4,582,985 A | 4/1986 | Löfberg |
| 4,707,592 A | 11/1987 | Ware |
| 4,972,476 A | 11/1990 | Nathans |
| 4,993,068 A | 2/1991 | Piosenka et al. |
| 5,448,045 A | 9/1995 | Clark |

(Continued)

FOREIGN PATENT DOCUMENTS

EP    924655 A2    6/1999

(Continued)

OTHER PUBLICATIONS

Electronic Privacy Information Center, 'National ID Cards and REAL ID' Act, EPIC, Nov. 8, 2007, entire document http://www.epic.org/privacy/id_cards/.*

(Continued)

*Primary Examiner*—Kambiz Zand
*Assistant Examiner*—Ronald Baum
(74) *Attorney, Agent, or Firm*—Dinesh Agarwal, P.C.

(57) ABSTRACT

A method and system for preventing or obstructing a person from negotiating a transaction with another person, group, or entity in a population, includes verifying and crosschecking the identity of the person and the status of the national identification card carried by the person, as a prerequisite to negotiating or entering into a transaction, such as purchasing an airline ticket. The identity of the person is verified and crosschecked by using a biometric characteristic unique to that person. If an irregularity is found during the verification or crosscheck, or if the identification card is found to be invalid or expired, the person is prevented or obstructed from negotiating that or any subsequent transaction with any other person, group or entity in the population.

19 Claims, 5 Drawing Sheets

U.S. PATENT DOCUMENTS

| | | | |
|---|---|---|---|
| 5,457,747 | A | 10/1995 | Drexler et al. |
| 5,513,272 | A | 4/1996 | Bogosian, Jr. |
| 5,604,802 | A | 2/1997 | Holloway |
| 5,869,822 | A | 2/1999 | Meadows, II et al. |
| 6,148,091 | A | 11/2000 | DiMaria |
| 6,208,264 | B1 | 3/2001 | Bradney et al. |
| 6,213,391 | B1 | 4/2001 | Lewis |
| 6,219,439 | B1 | 4/2001 | Burger |
| 6,351,817 | B1 | 2/2002 | Flyntz |
| 6,386,451 | B1 | 5/2002 | Sehr |
| 2001/0045458 | A1 | 11/2001 | Polansky |
| 2002/0128969 | A1 | 9/2002 | Parmelee et al. |
| 2002/0129257 | A1 | 9/2002 | Parmelee et al. |
| 2003/0028811 | A1 | 2/2003 | Walker et al. |
| 2003/0056113 | A1 | 3/2003 | Korosec |
| 2003/0196097 | A1 | 10/2003 | Korosec et al. |

FOREIGN PATENT DOCUMENTS

| | | |
|---|---|---|
| EP | 1139302 A2 | 10/2001 |
| EP | 1139302 A3 | 10/2001 |
| GB | 2151987 A | 7/1985 |
| GB | 2331825 A | 6/1999 |

OTHER PUBLICATIONS

Computimes Malaysia, "Pilot smartcard to roll out next year", Computimes Malaysia, Oct. 8, 1998.

Hendry, Mike, Smart Card Security and Applications, Artech, Inc. 1997.

http://www.ins.usdoj.gov/graphics/aboutins/foia/ereadrm/reference/majorinfosys/.

Mcgookin, Steve. (Nov. 5, 1998). Taking democracy into the digital age: Fingerprints, photographs and signatures are all you need to vote with your elector's smart card.

The Oregonian, "New System Speeds Travelers Through Immigration Points", May 5, 1997, Oregonian Publishing Company, Travel Roundup, T09.

Delaney, Kevin J., Prada, Paulo, "IBM to Unveil Biometric Pact—Security-Technology System Could Cut Travelers' Airport Time", Apr. 25, 2007, Wall Street Journal, Travel Column.

Kopytoff, Verne G., "High Tech Help for Frequent Travelers Entering U.S.", Jan. 14, 1999, New York Times, Identity Checks Column, late edition.

Howard, Clark, "Budget Traveler ID question can positively cloud air travel", Aug. 11, 1996 The Atlantic Journal the Atlantic Constitution.

Buffalo News, "Border Won't Delay Air Passengers", Apr. 24, 1998, Buffalo News, CITY edition, p. B2.

Robert O'Harrow Jr. and Jonathan Krim, *National ID Card Gaining Support*, Dec. 17, 2001, pp. 1-9, The Washington Post, www.washingtonpost.com.

Mike Allen and Bill Miller, *Bush Proposes Tracking System for Noncitizens*, Jan. 26, 2002, p. A-11, The Washington Post, www.washingtonpost.com.

Wong, Teri, "Towards a smartcard-using nation:[2* Edition]", Mar. 1, 2000. Mew Straits Times, Kuala Lumpur, p. 08.

McCullagh, Declan, "New national ID plan checks in", Feb. 18, 2003, ZDNET, http://zdnet.com.com/2100-1107-984835.html, entire article.

Barnes, Bill, "The National ID Card", Nov. 8, 2001, Webhead, http://salte.msn.com/id/2058321/. entire article.

Scheeres, Julia, "Support for ID Cards Waning", Mar. 13, 2003, Wired News, http://www.wired.com/news/print/0,1294,51000,00.html, entire article.

Neumann, P.G., et al. "Risks of National Identity Cards", Dec. 12, 2001, Inside Risks 138, CACM 44, http://www.csi.sri.com/users/neumann/insiderisks.html#138, entire article.

Drudge, Matt, "Bush Contemplates National ID Card For All Citizens", Sep. 23, 2001, Drudge Report, http://www.drudgereport.com/id.htm, entire article.

Privacy International, "Privacy International's Identity Cards Frequently Asked Questions", Aug. 24, 1996, http://www.privacyorg/pi/activities/idcard/idcard/idcard_faq.html. entire article.

Stand.org.uk, "Entitlement Cards and Identity Fraud", verision 1.0, Jan. 31, 2003, Creative Commons, entire document, http://www.stand.org.uk/IdCardResponse.html.

* cited by examiner

NATIONAL IDENTIFICATION CARD SYSTEM AND BIOMETRIC IDENTITY VERIFICATION METHOD FOR NEGOTIATING TRANSACTIONS

This is a continuation of application Ser. No. 10/994,365, filed Nov. 23, 2004, now U.S. Pat. No. 6,971,031 B2, which is a continuation of application Ser. No. 09/985,734, filed Nov. 6, 2001, now U.S. Pat. No. 6,934,861 B2, which are hereby incorporated herein in their entirety by reference.

FIELD OF THE INVENTION

The present invention is directed to a security system, and more particularly to a crosscheck identification system which obstructs or prevents a person from negotiating a transaction with another person, group, or entity in a population, if during a crosscheck it is determined that a person's record contains questionable information, or if an identification card carried by that person is invalid or has expired.

The prior art is replete with security systems that verify the identity of a person or an identification card carried by that person prior to allowing that person to execute a transaction. For example, financial institutions typically issue various types of identification cards bearing a magnetic strip encoded with identifying and other related information about the user. The user chooses or is assigned with a password known only to the user that is verified at a remote location when the user's information is read from the card by a reader and the password information is inputted into the system separately from the card. Other systems include encoding the card with some type of biometric information of the user wherein the bearer of the card submits to the system to confirm the identity of the bearer with the biometric information directly received from the user prior to executing a transaction.

In conventional systems, if the identity of the person is not confirmed, or if the identification card is found to be invalid for some reason, the user is permitted to submit another card, or the user simply does not execute the transaction. For example, if a person wishes to purchase items on a credit card, such as VISA®, MASTER CARD®, DISCOVER®, AMERICAN EXPRESS®, etc., and if the card is found to have been expired, or if the identity of the person encoded on the card does not match with the person submitting it for a transaction, the user may simply not purchase the items, pay cash, or use another card. In other words, it is the user's option to either submit another form of payment or refuse the transaction altogether. Similarly, if a person uses an identification or security card for, for example, gaining access to a building or facility, and if the card is determined to have been expired, invalid, or if there is an unsuccessful match between the identity of the person from those previously authorized to gain entry, the user is simply denied entry. The denial of entry into a building, or a decision not to execute a transaction, does not in any way limit that person's ability to enter into or execute another transaction with another person, group, or entity. In other words, the present systems fall short of preventing or obstructing a person from negotiating a transaction with another person, group, or entity, if irregularities, such as invalidity of the identification card, criminal record, etc., are found.

Although conventional systems, to a large extent, fulfill the required level of security needs thus far, there is a need for an improved and better security system which addresses the security breaches that occurred recently which led to terrorist attacks on the World Trade Center (New York) and the Pentagon (near Washington, D.C.) on Sep. 11, 2001. In those attacks, three commercial jet-liners were intentionally crashed into the Twin Towers of the World Trade Center and the Pentagon after being hijacked. A total of nineteen hijackers took over and commandeered the planes into these buildings. Although none of the hijackers were reported to have any pilot license, a few of them had taken flying lessons at various flying schools around the country. Surprisingly, at least one of them was reported to have been keen on learning just to maneuver an advanced jetliner like Boeing 727, without learning to land or take-off an advanced commercial jet. Another hijacker, without any previous flying training or experience, was reported to have sought training to fly a Boeing 747 in a flight simulator. That hijacker also carried several thousand dollars in cash to pay for the lessons.

It was also reported that one of the lead hijackers left a stalled-out plane on the runway after landing, on one occasion during a flying lesson. At least one of the leading hijackers was reported to be highly educated, and all of them were leading normal lives in the United States, Germany and other countries. All of the hijackers were foreign nationals who had entered the United States on temporary (student, tourist, and business) visas obtained at the U.S. Embassies abroad. One of the hijackers, who held a student visa, never attended the school he had applied to. Notwithstanding the suspicious and unusual behavior on part of these hijackers, the hijackers were able to negotiate, enter into and execute various day-to-day transactions, such as rent an apartment and purchase items of daily needs, for several years prior to hijacking the planes.

Since the September $11^{th}$ attack, many private and government experts have surmised if somehow this great tragedy could have been avoided if there was some type of security system in place that would have prevented the actions of the perpetrators.

The present invention was devised, particularly in view of the recent tragic events, and is meant to function as a safeguard against undesirable actions on the part of those finding it easy to engage in behavior that might threaten other peoples' lives or cause damage to property.

Various identification systems are disclosed in U.S. Pat. Nos. 3,702,392; 4,582,985; 4,707,592; 4,993,068; 6,148,091; 6,208,264B1; 6,213,391B1; and 6,219,439B1.

In view of the deficiencies associated with conventional security systems, there is a need in the industry for a method and system which prevents or obstructs a person from negotiating first and subsequent transactions, in the event an irregularity is found in the first transaction.

OBJECTS AND SUMMARY OF THE INVENTION

The principal object of the present invention is to provide a method and system for preventing or obstructing a person from negotiating a transaction with another person, group, or entity in a population upon the occurrence of a pre-selected event(s).

Another object of the present invention is to provide a method and system which checks, crosschecks, verifies the identifying, and profile and/or biometric information of a person to determine whether or not the person may proceed to negotiate a transaction, such as seeking employment, seeking financial and/or social assistance from a private or government entity, purchasing or leasing real estate, purchasing or leasing vehicles, purchasing travel tickets, seeking medical care, seeking lodging or boarding, seeking enrollment at schools, colleges, universities and other vocational schools for education or training, visiting places and/or buildings, seeking entry into a country, etc.

An additional object of the present invention is to provide a method and system for verifying a person's identity, immigration or non-immigration status, background record (criminal, etc.) as a prerequisite to negotiating or entering into a transaction over a certain predetermined amount, with another person, group, or entity in a population.

Yet an additional object of the present invention is to provide a method and system which, in effect, incapacitates or immobilizes a person in a population since that person is prevented or obstructed from negotiating any transaction with another person, group, or entity in the population, in the event the portable data device or the national identification card carried by the person, and containing electronically coded information about that person, is found to be inactive or expired, or if the card is found as not belonging to that person, has been tampered with, or is counterfeit. It is noted that the system of the invention is not a substitute for the conventional identification or transaction cards, such as MASTER CARD®, VISA®, DISCOVER®, and AMERICAN EXPRESS®, but serves as a supplement thereto. For example, a person wishing to negotiate a transaction, such as purchasing an airline ticket, would first have to clear the security requirements of the system of the present invention, followed by purchasing the ticket itself by, for example, using a credit card. Therefore, the system of the present invention, first validates the person wishing to negotiate a transaction, as a legitimate and rightful person, and then allows the person to proceed to negotiate the transaction itself. Accordingly, the system functions as a national security system.

A further object of the present invention is to provide a method and system for preventing or obstructing a person from negotiating a second or subsequent transaction(s) with another person, group, or entity in a population where the person was obstructed from negotiating a first or previous transaction(s).

In accordance with the present invention, a method of obstructing a person from negotiating a transaction with another person, group, or entity in a population, includes selecting for each person in a selected section of a population an identifying biometric characteristic unique to that person; determining profile information of each person; storing the identifying characteristic and the profile information of each person in individual portable data devices to be carried by respective persons, the data devices including an active status and an inactive status; storing the identifying characteristic and the profile information of each person collectively at a central location; determining an identifying biometric characteristic and the profile information of a person wishing to negotiate a transaction from the portable data device carried by the person; comparing the identifying characteristic and the profile information from the data device with the corresponding identifying characteristic and the profile information prestored in at the central location for a successful or unsuccessful comparison; obtaining profile information and biometric characteristic directly from the person wishing to negotiate the transaction; comparing the identifying characteristic and the profile information obtained from the data device and that obtained directly from the person for a successful or unsuccessful comparison; determining an active or inactive status of the data device carried by the person; obstructing the person from negotiating the transaction if an unsuccessful comparison is indicated in either of the previous steps, or if the status of the data device is determined to be inactive; and notifying an appropriate authority if the status of the data device is determined to be inactive.

In accordance with the present invention, a national security system for obstructing a person from negotiating a transaction with another person, group, or entity in a population, includes a national security card to be carried by each person in a selected section of a population, the national security card including prestored profile information and an identifying biometric characteristic unique to each person; a card reader including a biometric scanner, the card reader including a first processing unit for comparing the biometric characteristic stored on the national security card of a person with the biometric characteristic obtained directly from that person for a successful or unsuccessful comparison; a remote second processing unit including prestored profile information and an identifying biometric characteristic of each person in the selected section of the population; a communication link between the card reader and the second processing unit. One of the first and second processing units compares the profile information and the biometric characteristic stored on the national security card with the profile information and the biometric characteristic prestored on the second processing unit for a successful or unsuccessful comparison. One of the card reader and the remote processing unit includes means for determining the active or inactive status of the national security card and communicating an inactive status to a predetermined authority. The card reader includes an active and inactive indicator for indicating the active or inactive status of the national security card. Wherein an inactive status of the national security card obstructs a person from negotiating a transaction with another person, group, or entity in a population.

BRIEF DESCRIPTION OF THE DRAWINGS

The above and other objects, novel features and advantages of the present invention will become apparent from the following detailed description of the invention, as illustrated in the drawings, in which.

DETAILED DESCRIPTION OF THE INVENTION

Figure 1:
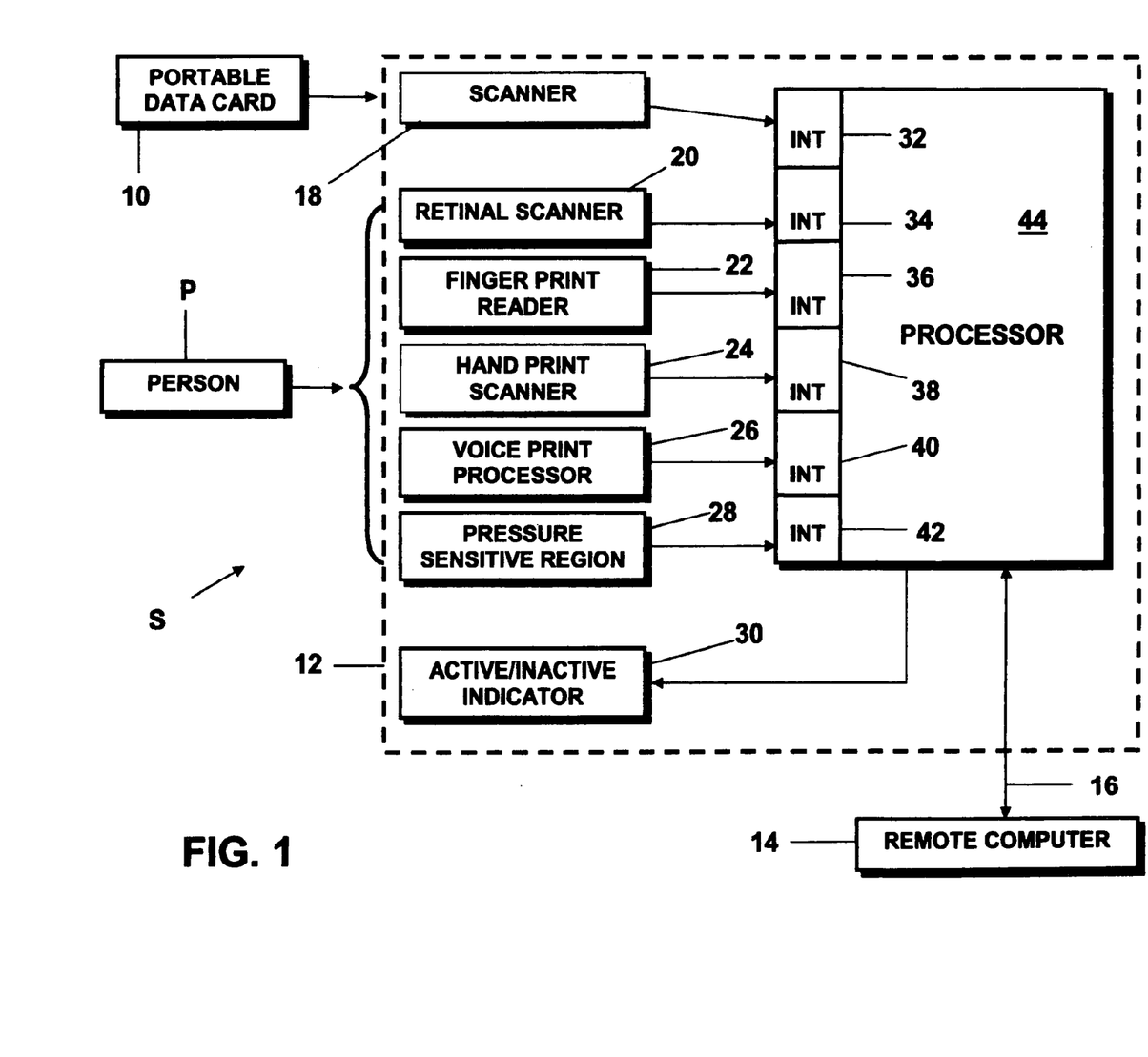
FIG. 1 is a block diagram of the security system of the present invention.

As best shown in FIG. 1, the crosscheck security system S of the present invention, includes a data device or national security card 10 to be carried by a person P and a data card reader 12. The data device 10 can be any one of many conventionally available credit-card sized cards that can be coded electrically, magnetically, electromagnetically, optically, electrooptically or by other conventional means, to include biometric and profile information about the person P, as noted below.

The data card reader 12 is preferably a self-contained stand-alone unit, which would typically be located at a transaction site. For example, the reader 12 would be placed at any location where a person may conduct a transaction to purchase goods or obtain services, from private or government entities. By way of a non-limiting example, some transaction sites would include airline, ship, train and bus ticket counters, department stores, retail outlets, educational or training institutions, apartment complexes, entrance to various private and government facilities and buildings, entrance to entertainment facilities such as stadiums, customs and border check-in places, etc.

Alternatively, the card reader 12 may be connected to a personal computer, internally or externally, to allow the users to negotiate transactions with a vendor or service provider from a remote location. For example, presently it is common to purchase goods, make hotel reservations, and purchase airline tickets via the Internet. In these situations, the user could have his/her data card reader integrated into the personal computer or locate it externally, in the same manner as, for example, a modem. The biometric characteristic and profile information could then be transmitted to the vendor or service provider for verification and crosscheck.

The card reader 12 is preferably connected to a remote computer 14 having pre-stored biometric and profile information of the persons in a selected section of a population. A communication link 16 between the card reader 12 and the remote computer 14 can be wired, wireless, or through the World Wide Web (the "Internet").

The data card reader 12 includes a card scanner 18, a retinal scanner 20, a fingerprint reader 22, a hand print reader 24, a voice print processor 26, a pressure-sensitive site or region 28, and an active/inactive indicator 30. The data or information from the card scanner 18, retinal scanner 20, fingerprint reader 22, hand print scanner 24, voice print processor 26, and the pressure-sensitive region 28, is converted to digital form by interfaces 32, 34, 36, 38, 40, and 42, respectively, for processing by a processor 44. As shown in FIG. 1, the card scanner 18, retinal scanner 20, fingerprint reader 22, hand print scanner 24, voice print processor 26, and the pressure sensitive region 28, collect information directly from the person P.

The active/inactive indicator 26 may preferably be in the form of a green/red light to indicate active or inactive status of the data card 12, respectively, or to indicate an unsuccessful match between the information collected from a person and the information pre-stored on the card 10 or the remote computer 14.

As noted previously, the main object of the present invention is to provide a method and system which prevents or obstructs a person from entering into or negotiating a transaction with another person, group, or entity in a population in the instances where a pre-selected event has occurred. For instance, if the data card 10, having a predetermined validity period, has expired or been rendered invalid/inactive by an appropriate authority, the person to whom this card was issued, would no longer be able to enter into or negotiate a transaction with another person, group, or entity in a population.

It is noted herewith that the security system of the present invention is not meant to substitute other conventional identification systems that are currently used to check or verify the validity or authenticity of persons or cards, such as credit cards and other security-related cards generally used to gain entrance into a building. In other words, the crosscheck security system S of the present invention functions as a prerequisite to conventional transaction systems where, for example, a credit card or other security card is used to obtain goods or services, or gain access to a building or facility.

Accordingly, under the crosscheck security system S of the invention, if the system is unable to verify and crosscheck the identity of a person from the pre-stored information about that person, or if the data card 10 carried by the person is expired or invalid, that person would be unable to proceed further to negotiate or enter into a transaction with anyone in the population. Preferably, this would include any financial transaction that has an initial threshold value of, for example, at least $100.00 (in U.S. dollars or other currency), whether based in cash or credit, or other delayed payment method, or non-financial transactions or obtaining non-tangible benefits under the law, such as gaining entry into a country, obtaining driver's or pilot license, etc.

It is noted herewith that the $100.00 threshold limit can be raised or lowered to decrease or increase the level of security, respectively, as needed. For example, in the instances where a top security level is desired, the initial threshold level may be decreased to zero, such that that all financial transactions would be subject to the security requirements of the system S. On the other hand, if only a minimum level of security is desired, the initial threshold level may be raised to more than $100.00 so that low value financial transactions would not be subject to the security requirements of the system S. The initial threshold value would be set by the user and can be varied, as desired. Preferably, the threshold value would be set at 0-$600.00.

It is noted that the system S can also be programmed such that the level of security is increased progressively. For example, if the initial threshold value is set at $150.00, and a person is obstructed from negotiating a first transaction, the remote computer would automatically lower the threshold values for the second and subsequent transactions by a predetermined differential, such as $50.00. Therefore, the person would be permitted to negotiate second and third transactions having values of less than $100.00 and $50.00, respectively, but would be prevented from the fourth transaction thereby completely immobilizing the person. Preferably, the differential would be set at $25.00-$150.00.

For non-financial transactions, such as seeking entry into a country, gaining entry into a private or government building or facility (Sears Tower, Eiffel Tower, the U.S. Capitol, the Centers for Disease Control (CDC), Nuclear Power Plants, Airports, National Parks, etc.), the initial threshold value would preferably, be set at zero.

The security system S of the present invention therefore functions as a national security system under which a pre-selected segment of a population, and preferably, each person in the population, including those crossing the borders to gain entry for any reason, would be required to obtain a data or national security card 10 from a government or government-authorized entity.

In operation of the crosscheck security system S of the invention, the first step is to issue data or national security cards 10 to selected persons, and preferably all the persons in a population.

Figure 2:
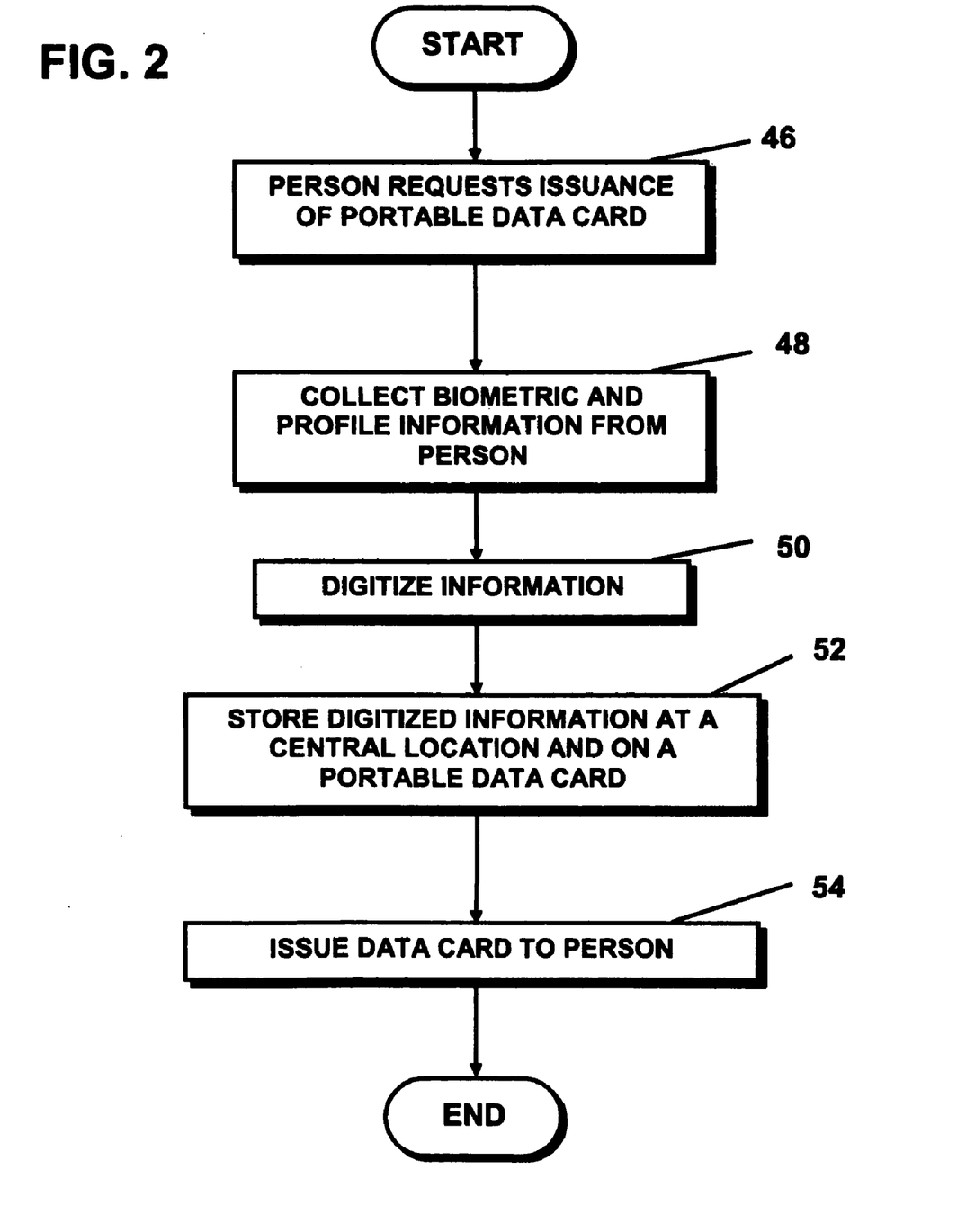
FIG. 2 is a flow chart of the method of the invention, illustrating issuance of a portable data card to a person.

As shown in FIG. 2, at the request of a person P (step 46), the biometric characteristic and profile information about the person is collected (step 48). The biometric characteristic or information can be a fingerprint(s), hand or palm print, retinal scan, voice sample, saliva, DNA, etc. or other biometric data which produces a digital profile that is sufficiently unique to provide a reasonable degree of certainty as to the identification of that person. Likewise, the profile information can include such information as name, address, date and place of birth, citizenship, medical and/or personal history, criminal record, passport information (date of issuance, number, issuing country, validity period, etc.), immigration or non-immigration visa information (category and duration, issuing consulate/embassy, etc.), licenses (driver's, pilot, etc.) and any other information unique to that person that may be used to create a digital profile of that person for a proper and sufficiently secure-proof identification.

The information collected in step 48 is then appropriately digitized (step 50) for storage at a central location (remote computer 14) and on the data card 10 (step 52) to be issued to the person P (step 54).

Figure 3:
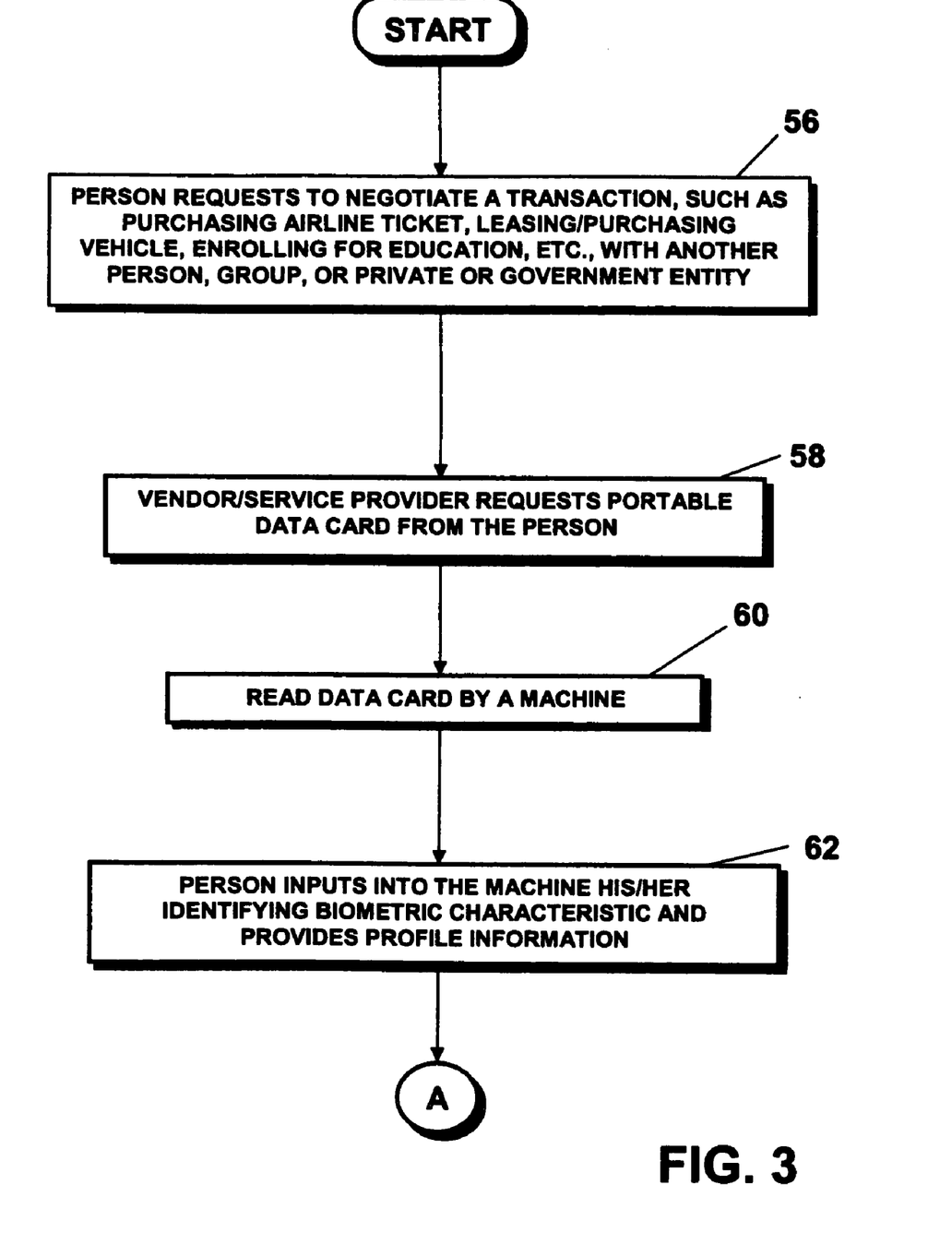
FIGS. 3-5 illustrate a flow chart of the verification portion of the method of the invention.
Figure 4:
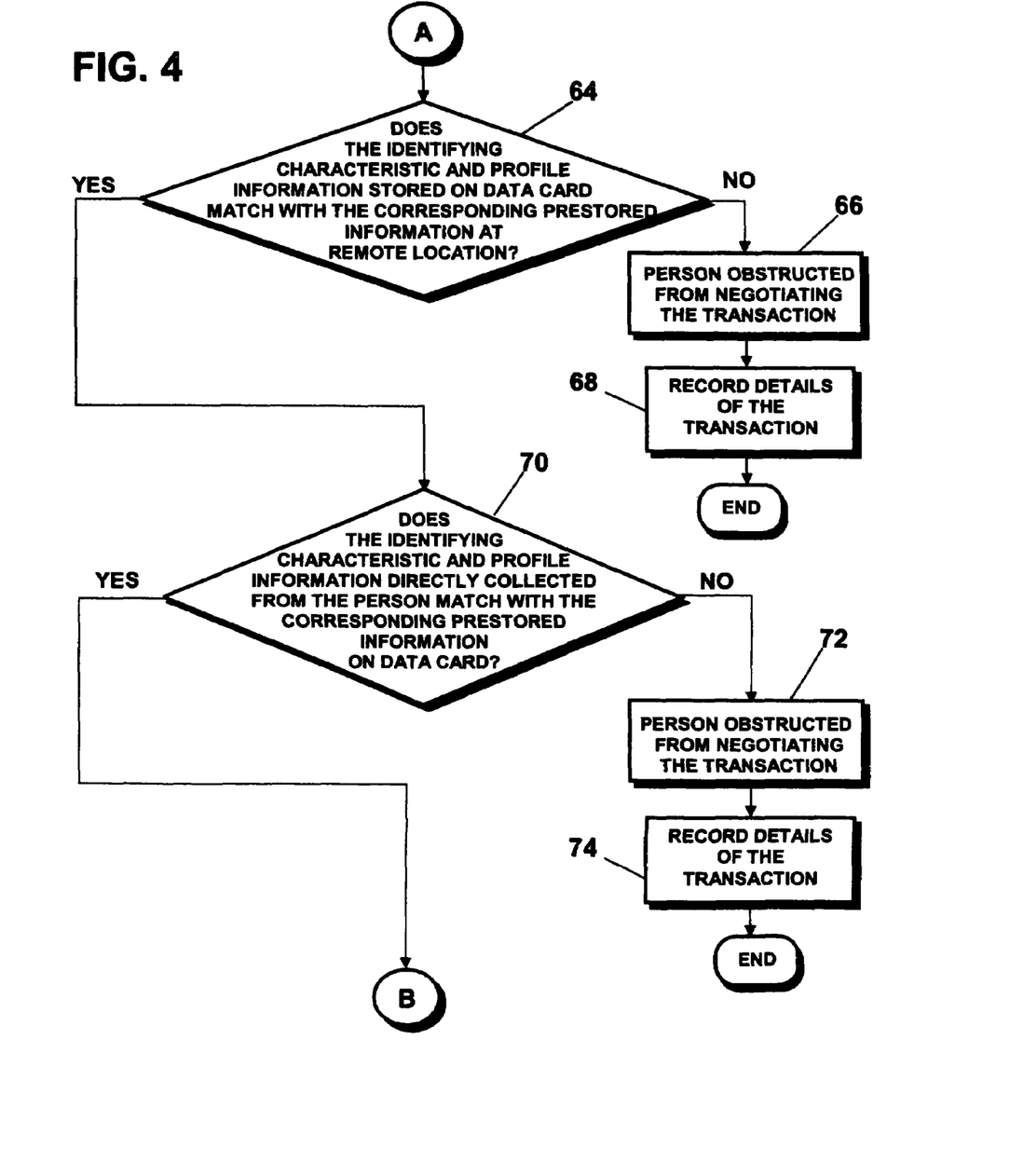
Figure 5:
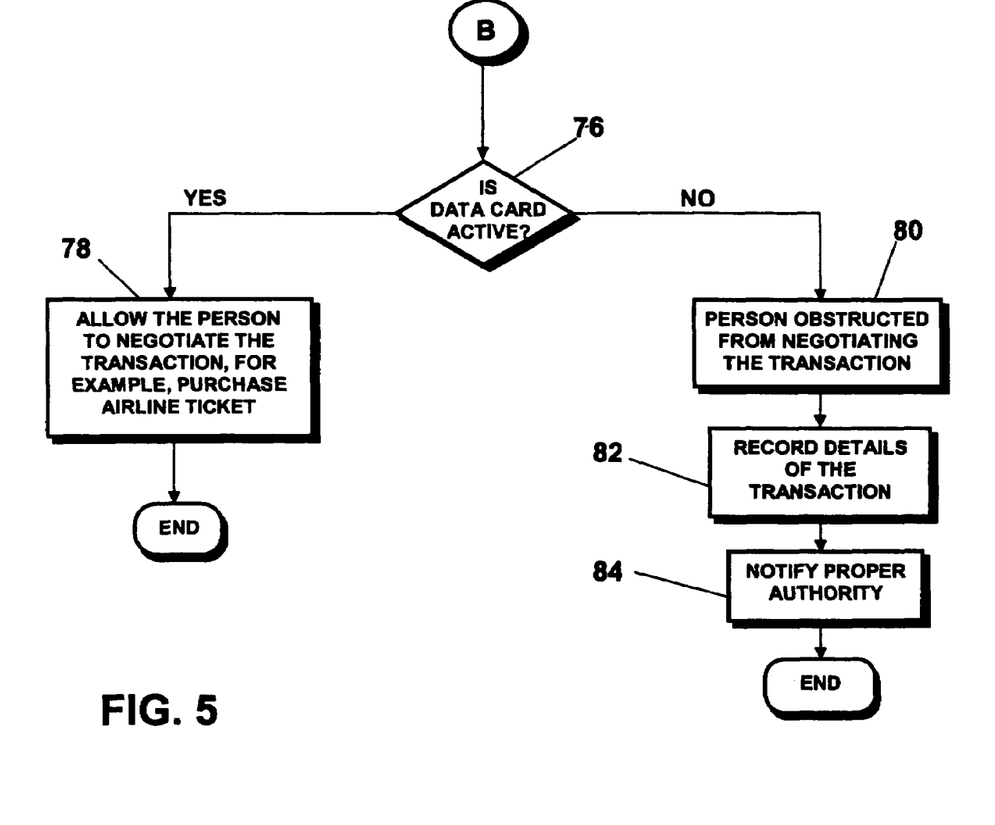

FIGS. 3-5 illustrate the steps involved in verifying and crosschecking the identity of a person when that person wishes to negotiate a non-financial transaction, or a financial transaction over a predetermined threshold limit, with another person, group, or entity in a population.

As illustrated, the person P wishing to negotiate a transaction (step 56) is requested to produce his/her data card 10 (step 58). The data card 10 is read by the reader 12 and the scanner 18 scans the digitized biometric characteristic and profile information therefrom (step 60). The person P then submits directly to the card reader 12 his/her biometric characteristic, such as a retinal scan, fingerprint, hand print, voice print, and/or signature (step 62).

The biometric characteristic and the profile information read from the data card 10 are then transmitted to the remote computer 14 for a successful or unsuccessful match (step 64) for a crosscheck. In the event of an unsuccessful match, the person P is prevented or obstructed from proceeding to negotiate the transaction (step 66), and the details of the transaction are stored (step 68) in the remote computer 14.

On the other hand, if a successful match is indicated in step 64, a second comparison is made between the identifying characteristic and profile information directly collected from the person P with the corresponding prestored information on data card 10 (step 70) for verification. The person P is obstructed from proceeding to negotiate the transaction, if an unsuccessful match is indicated (step 72), and the details of the transaction are stored (step 74) in the remote computer 14. However, if a successful match is indicated in step 70, the active or inactive status of the data card 10 is then determined, either by the card reader 12 or the remote computer 14 (step 76). If the status of the data card 10 is determined to be active, the person is allowed to proceed to negotiate the transaction (step 78). On the other hand, if it is determined that the data card 10 is inactive (expired, invalidated, etc.), the person is prevented or obstructed from proceeding to negotiate the transaction (step 80). In addition to obstructing the person from negotiating the transaction, the security system S records the details of the transaction (step 82) and notifies a proper authority (step 84), which could be a law enforcement authority, for further action.

Since the main function of the security system S of the invention is to prevent a person, particularly those who may engage in committing a crime, or may be involved in preparations, alone or in concert with others, leading to committing a crime, or to follow the suspicious or other undesirable behavior, the profile information of a person is updated to include details of each transaction attempted to be negotiated by that person in each instance of being obstructed (steps 66, 72 or 80). For example, the amount of each transaction, the identity(ies) of the person, group, or entity with whom the transaction was being negotiated by the person, and the nature of the transaction (types of goods or services sought) are recorded. This information would be particularly useful to a law enforcement authority, in the event it is found that the person obstructed, particularly in step 80, has a questionable background, has been wanted for past criminal or other behavior, or should be monitored for law enforcement purposes. For example, if a person wanted by a law enforcement authority attempts to negotiate several transactions and is obstructed in each instance, the law enforcement authority could very easily determine the location and whereabouts of the person, and particularly the types of goods and services sought by that person. This type of information would be of enormous help to the law enforcement authorities where the person has been involved in making preparations to commit an illegal act or engage in an unwanted behavior.

It is noted herewith that it is not necessary that only one type of biometric characteristic be used for the purpose of verifying and crosschecking the identity of the person. In other words, any combination of one or more of the biometric characteristics may be used in the security system S depending upon the level of security needed. For example, a person wishing to gain access to highly secure, sensitive locations could be issued a data card that requires verification and crosscheck of all of the biometric characteristics, i.e., retinal scan, fingerprint, hand print, voice print, and a signature. In this regard, it would be preferable to use a data card that has capacity to add additional levels of security by adding more detailed profile information about the person. The data card may further optionally include other data, such as social security number, sex, hair color, height, weight, educational and medical information, organizational affiliations, special skills and licenses, etc.

As can be observed from the above, the crosscheck security system S of the invention is effective in immobilizing a person, if his/her national identification card has expired or been invalidated by a government agency, the issuing authority, or other government-authorized entity. This is particularly useful in tracking the whereabouts and movement of a person in a population as the details of each transaction attempted to be negotiated by that person are recorded.

Further, since the obstructed person can no longer negotiate any transaction, including further transactions, with any person, group or entity in the population, including the purchase of daily need items, renewal of apartment lease, etc., it would become very difficult for that person to lead a normal daily life, and/or engage in an unlawful behavior.

In the event, the national security card of a person has expired or been invalidated, that person must return to the card issuing authority or other designated entity to have the card renewed or validated, in order to be able to negotiate transactions and become mobile again in the population. The crosscheck security system S of the invention would therefore be very useful in tracking the status and movement of the persons entering a country on temporary visas (the terms of which are limited and prefixed), such as foreign students, tourists, temporary foreign workers, etc.

Recently, it has been a concern of the U.S. Government that many students from foreign countries obtain student visas and enter the United States with the apparent intent to obtain education, training, etc., at various schools, colleges and universities. However, they either do not attend the educational institutions, or continue to stay past their term as restricted by the U.S. Immigration. At the present time, it is voluntary that the person return to the appropriate government agency or authority to have the term of the visa extended or renewed. Therefore, once a person is in the United States, presently there is no system to check the whereabouts of that person. The crosscheck security system S of the invention would be particularly useful in these circumstances. Once the national security card, issued by, for example, the U.S. Immigration, has expired, the person would no longer be able to negotiate any transaction, including re-enrolling at a school, seek employment, seek/renew lodging or boarding, secure daily need items, travel, etc. This would require that the person return to an appropriate authority or agency to have the card renewed or validated, or its term extended.

In this regard, the system S could be programmed such that the renewal, validation, or extension of a visa or work permit would be granted to only those persons who have fulfilled the predetermined requirements of their stay in the country. For example, it may be required that the persons on student visas obtain verification of satisfactory attendance at their schools, as a precondition to their continued stay in the country. Likewise, the visas/work permits of the temporary foreign workers could be extended only upon a showing that they have performed satisfactorily at their places of employment.

While this invention has been described as having preferred ranges, steps, materials, or designs, it is understood that it is capable of further modifications, uses and/or adaptations of the invention following in general the principle of the invention, and including such departures from the present disclosure, as those come within the known or customary practice in the art to which the invention pertains and as may be applied to the central features hereinbefore set forth, and fall within the scope of the invention and of the appended claims.

What I claim is:

1. A method for tracking a person down in a population by obstructing the person from negotiating a transaction with another person, group, or entity in the population, comprising the steps of:
   a) selecting for each person in the population of a country an identifying biometric characteristic unique to that person;
   b) determining profile information of each person in the population;
   c) storing the identifying characteristic and the profile information of each person in the population in individual portable data devices to be carried by respective persons, the data devices including an active status and an inactive status;
   d) storing the identifying characteristic and the profile information of each person in the population collectively at a central location;
   e) converting the data device of the person to be tracked down to an inactive status;
   f) determining an identifying biometric characteristic and the profile information of a person wishing to negotiate a transaction from the portable data device carried by the person;
   g) comparing the identifying characteristic and the profile information determined in step f) with the corresponding identifying characteristic and the profile information prestored in step d) for a successful or unsuccessful comparison;
   h) obtaining a portion of the profile information and a biometric characteristic directly from the person in step f);
   i) comparing the identifying characteristic and the profile information obtained in steps f) and h) for a successful or unsuccessful comparison;
   j) confirming the profile information of the person wishing to negotiate the transaction obtained in step h) with the corresponding profile information of the person to be tracked down as being the same;
   k) confirming comparisons carried out in steps g) and i) as successful comparisons;
   l) determining an active or inactive status of the data device carried by the person in step f); and
   m) obstructing the person in step f) from negotiating the transaction if the status of the data device is determined to be inactive in step 1);
   n) wherein the person in step f) is tracked down in the population by being barred from negotiating any transaction with any person, group, or entity in the population.

2. The method of claim 1, further comprising the step of:
   o) further obstructing the person obstructed from negotiating the transaction in step m) from negotiating any subsequent transaction with any other person, group, or entity in the population.

3. The method of claim 1, further comprising the step of:
   o) notifying a law enforcement authority if an unsuccessful comparison is indicated in the step l).

4. The method of claim 1, wherein:
   the value of the transaction in step f) is at least $100.00.

5. The method of claim 1, wherein:
   the biometric characteristic is selected from the group consisting of fingerprint, hand print, retinal scan, and voice sample.

6. The method of claim 1, wherein:
   the portable data device comprises an electronically, magnetically, electromagnetically, optically, or electrooptically codable card.

7. The method of claim 1, wherein:
   the profile information includes one or more of name, address, date of birth, country of citizenship, type and duration of immigration visa, passport number and the country of issuance, and criminal record.

8. The method of claim 1, wherein:
   the transaction comprises a transaction category selected from the group consisting of seeking entry into a country, seeking financial or social assistance from a private or government entity, seeking employment, securing housing, securing goods, securing lodging or boarding, seeking education or training, traveling, and seeking medical assistance.

9. The method of claim 8, further comprising the step of:
   o) updating the profile information of the person in step f) obstructed in step m) to include details of the transaction, the details comprising one or more of the following:
      i) amount of transaction;
      ii) identity of the person, group, or entity with whom the transaction was being negotiated by the person in step f); and
      iii) the category of the transaction.

10. The method of claim 9, further comprising the step of:
    p) further updating the profile information of the person in step f) obstructed in step m) to include details of each transaction attempted to be negotiated by the person subsequent to the transaction in step f).

11. The method of claim 1, wherein:
    the central location comprises a remote location; and
    the step g) is carried out by accessing a computer located at the remote location by a wired or wireless communication, or the Internet.

12. The method of claim 2, wherein:
    the value of the first transaction is at least $150.00; and
    the value of the second or subsequent transaction is lower than the value of the first or previous transaction by a predetermined amount.

13. The method of claim 12, wherein:
    the predetermined amount is $50.00.

14. A system for tracking a person down in a population by obstructing the person from negotiating a transaction with another person, group, or entity in the population, comprising: a) a card to be carried by each person in the population of a country; b) said card comprising prestored profile information of a person carrying said card and an identifying biometric characteristic unique to that person; c) a card reader comprising a biometric scanner; d) said card reader including a first processing unit for comparing the biometric characteristic stored on the card of a person with the biometric characteristic obtained directly from that person for a successful or unsuccessful comparison; e) a remote second processing unit including prestored profile information and an identifying biometric characteristic of each person in the population; f) a communication link between said card reader and said second processing unit; g) one of said first processing unit and said second processing unit for comparing the profile information and the biometric characteristic stored on the card with the profile information and the biometric characteristic prestored on said second processing unit for a successful or unsuccessful comparison; h) means for converting a card to an inactive status; i) one of said card reader and said remote processing unit including means for determining the active or inactive status of the card and communicating an inactive status to a predetermined authority; and j) said card reader including active and inactive indicator for indicating the active or inactive status of the card; k) whereby an inactive status of the card tracks a person down in the population by obstructing the person from negotiating any transaction with any person, group, or entity in the population.

15. The security system of claim 14, wherein:
said communication link comprises a wired or wireless link, or the Internet.

16. The security system of claim 14, wherein:
the biometric characteristic is selected from the group consisting of fingerprint, hand print, retinal scan, and voice sample.

17. The security system of claim 14, wherein:
the transaction has a value of at least $100.00.

18. The security system of claim 14, wherein: the inactive status of the card corresponds to an unsuccessful match between the biometric characteristic stored on the card and the biometric characteristic obtained directly from the person.

19. The security system of claim 14, wherein: the inactive status of the card corresponds to an unsuccessful match between the profile information and the biometric characteristic stored on the card, and the profile information and the biometric characteristic prestored on said second processing unit.

* * * * *